(12) United States Patent
Brown et al.

(10) Patent No.: US 10,151,269 B2
(45) Date of Patent: Dec. 11, 2018

(54) MASS EFFICIENT PISTON

(71) Applicant: GM GLOBAL TECHNOLOGY OPERATIONS LLC, Detroit, MI (US)

(72) Inventors: Tyson W. Brown, Royal Oak, MI (US); Anil K. Sachdev, Rochester Hills, MI (US); Alin C. Dragoiu, White Lake, MI (US); Vincent V. Tiaga, White Lake, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 258 days.

(21) Appl. No.: 15/184,434

(22) Filed: Jun. 16, 2016

(65) Prior Publication Data

US 2017/0363040 A1 Dec. 21, 2017

(51) Int. Cl.
*F16J 1/04* (2006.01)
*F02F 3/22* (2006.01)
*F16J 1/00* (2006.01)
*F16J 9/00* (2006.01)
*F16J 1/16* (2006.01)
*F02F 3/00* (2006.01)

(52) U.S. Cl.
CPC ............... *F02F 3/22* (2013.01); *F16J 1/001* (2013.01); *F16J 1/16* (2013.01); *F16J 9/00* (2013.01); *F02F 2003/0007* (2013.01)

(58) Field of Classification Search
CPC .. F16J 1/001; F02F 2003/0007; F02F 3/0076; F02F 3/20; F02F 3/22
See application file for complete search history.

(56) References Cited

U.S. PATENT DOCUMENTS

| 1,944,223 | A | * | 1/1934 | Day | F02F 3/02 92/232 |
|---|---|---|---|---|---|
| 2,070,197 | A | * | 2/1937 | Bruegger | F16J 1/06 92/197 |
| 2,400,503 | A | * | 5/1946 | Harper, Jr. | F16J 1/04 92/214 |
| 4,702,151 | A | * | 10/1987 | Munro | F02F 3/0069 92/237 |
| 6,840,156 | B1 | | 1/2005 | Gillman et al. | |
| 7,299,772 | B1 | * | 11/2007 | Hardin | F02F 3/22 123/193.1 |
| 8,286,606 | B2 | * | 10/2012 | Breidenbach | F02F 3/0084 123/193.6 |

(Continued)

FOREIGN PATENT DOCUMENTS

WO    WO 2015018712 A1 *  2/2015  ............. F16J 1/001

*Primary Examiner* — Michael Leslie

(57) ABSTRACT

An integrally formed piston has a crown portion having an upper crown surface and an undercrown surface. A ring belt extends from the undercrown surface at a periphery thereof. The ring belt includes an uppermost ring land and at least one oil galley contoured to extend around at least two surfaces of the uppermost ring land. The oil galley has an opening at the undercrown surface for receiving a cooling fluid therein for cooling the uppermost ring land. A skirt extends from the undercrown surface and the ring belt and has a plurality of stiffening features arranged in a truss formation. At least one of the plurality of stiffening features has an I-beam cross-section and another of the plurality of stiffening features has a negative draft angle.

17 Claims, 4 Drawing Sheets

(56) References Cited

U.S. PATENT DOCUMENTS

| | | | |
|---|---|---|---|
| 8,720,405 B2* | 5/2014 | Golya | F02F 3/02 123/193.4 |
| 9,945,320 B2* | 4/2018 | Frode | F16J 1/001 |
| 2008/0121102 A1* | 5/2008 | Scharp | F02B 23/0696 92/208 |
| 2014/0299091 A1 | 10/2014 | Ribeiro et al. | |

* cited by examiner

MASS EFFICIENT PISTON

FIELD

The present disclosure relates to internal combustion engines, and more particularly to a piston for use in an internal combustion engine.

INTRODUCTION

The statements in this section merely provide background information related to the present disclosure and may not constitute prior art.

Engine pistons are commonly manufactured from iron or aluminum alloys through a casting and/or forging process. Piston material and design contribute to the overall durability and performance of an engine. A piston has various parts that contribute to this overall durability and performance. A piston crown is the upper surface exposed to engine combustion temperatures. A ring belt carrying compression and oil control rings extends from the edge of the crown. The portion of the piston on the outer diameter closest to the crankshaft is the piston skirt. The piston skirt has curved sidewalls extending from the ring belt to absorb reciprocating thrust forces exerted on the piston. The piston skirt also assists in aligning the piston in the cylinder bore as it moves during cycling. A pin boss may extend between the skirt walls for receiving a wrist pin for connection with a connecting rod.

Engine manufacturers are encountering increasing demands to improve engine efficiencies and performance including, but not limited to, improving fuel economy, improving fuel combustion, reducing oil consumption and increasing exhaust temperature for subsequent use in catalytic conversion of exhaust gases. The engine piston provides many opportunities to improve on these goals.

SUMMARY

In a first arrangement, an integrally formed piston has a crown portion, a ring belt, and a plurality of crown and skirt support features. The crown portion has an upper crown surface and an undercrown surface. The ring belt extends from the undercrown surface and around the periphery of the crown portion. The plurality of crown and skirt support features extend from the undercrown surface and the ring belt so as to form a skirt having a truss arrangement.

In another arrangement, an integrally formed piston has a crown, a ring belt, and a skirt. The ring belt extends from a surface of the crown at a periphery thereof. The ring belt includes a plurality of ring lands and at least one oil galley extending therethrough. The skirt extends from the surface of the crown and the ring belt and has a plurality of stiffening features. At least one of the plurality of stiffening features has an I-beam cross-section. Furthermore, the crown, the ring belt, and the skirt are integrally formed through an additive manufacturing process.

In yet another arrangement, an integrally formed piston has a crown portion having an upper crown surface and an undercrown surface. A ring belt extends from the undercrown surface at a periphery thereof. The ring belt includes at least one ring land and at least one oil galley contoured to extend around at least two surfaces of the at least one ring land. The oil galley has an opening at the undercrown surface for receiving a cooling fluid therein for cooling the at least one ring land. A skirt extends from the undercrown surface and the ring belt and has a plurality of stiffening features arranged in a truss formation. At least one of the plurality of stiffening features has an I-beam cross-section and another of the plurality of stiffening features has a negative draft angle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
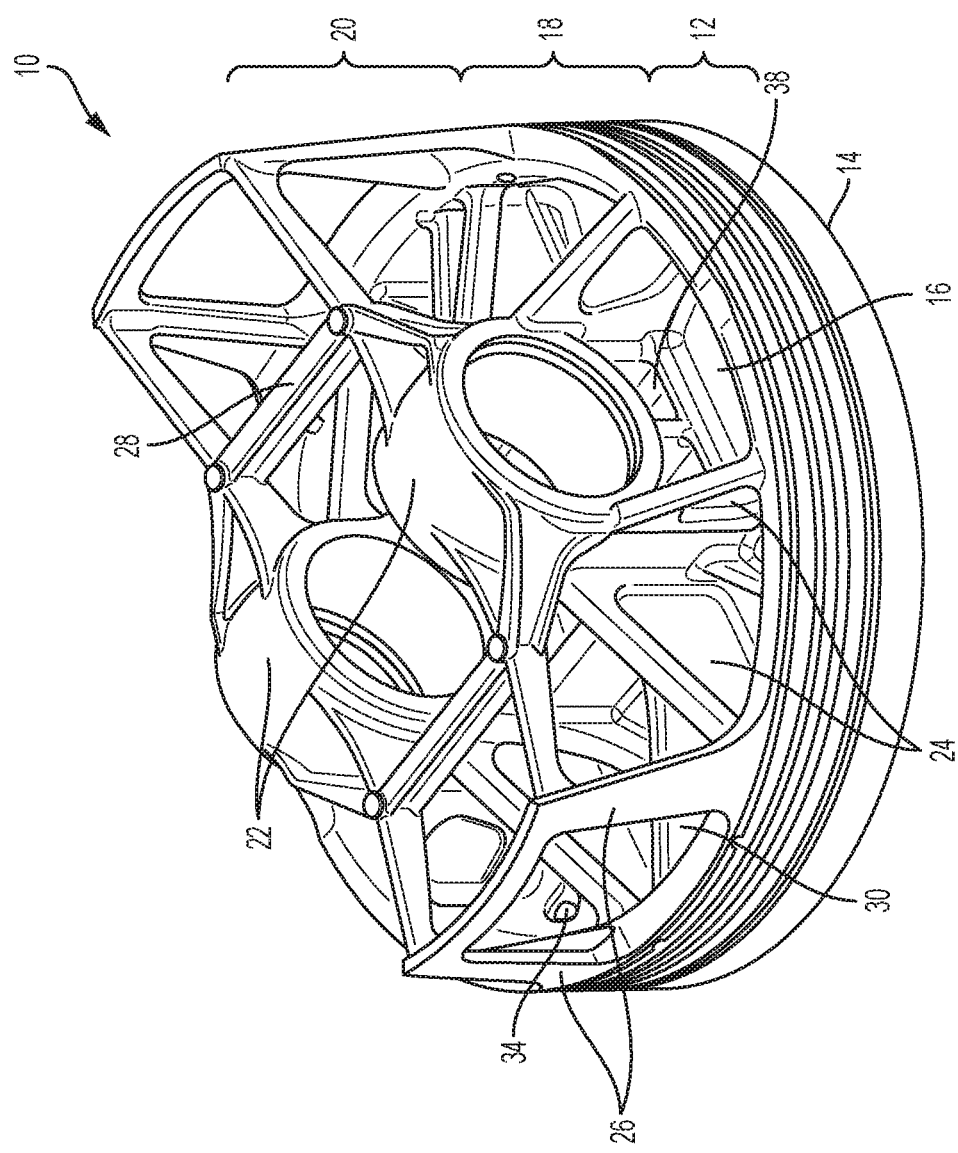
FIG. 1 is a perspective view of a piston according to the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Furthermore, it should be understood that throughout the drawings, corresponding reference numerals indicate like or corresponding parts and features. Further, directions such as "top," "side," and "back" are used for purposes of explanation and are not intended to require specific orientations unless otherwise stated.

Referring now to FIG. 1, an exemplary piston 10 formed by additive manufacturing (i.e., 3-D printing or direct metal laser sintering) is shown. The piston 10 includes various features irrespective of manufacturing technique including a crown 12 having an outer crown surface 14 and an undercrown surface 16. In use, the crown surface 14 is exposed to engine combustion temperatures and gases, while the undercrown surface 16 is exposed to crankcase fluids including air, oil vapor and liquid oil droplets or spray. The crown surface 14 can be formed to have any suitable shape or configuration known for providing appropriate combustion gas flow depending upon the particular application for which the piston 10 is designed. A ring belt 18 for carrying compression and oil control piston rings (not shown) extends downward from the edge of the crown 12 in order to prevent blow-by gases from escaping around the periphery of the crown 12. A skirt 20 extends from the ring belt 18 to absorb thrust forces during piston 10 movement. The undercrown surface 16 of the piston also includes a pair of pin bosses 22. The pin bosses 22 have pin bores aligned along a pin bore axis for receiving a wrist pin that connects the piston 10 with a connecting rod (not shown) and ultimately with a crank shaft (not shown) of an engine.

Figure 2:
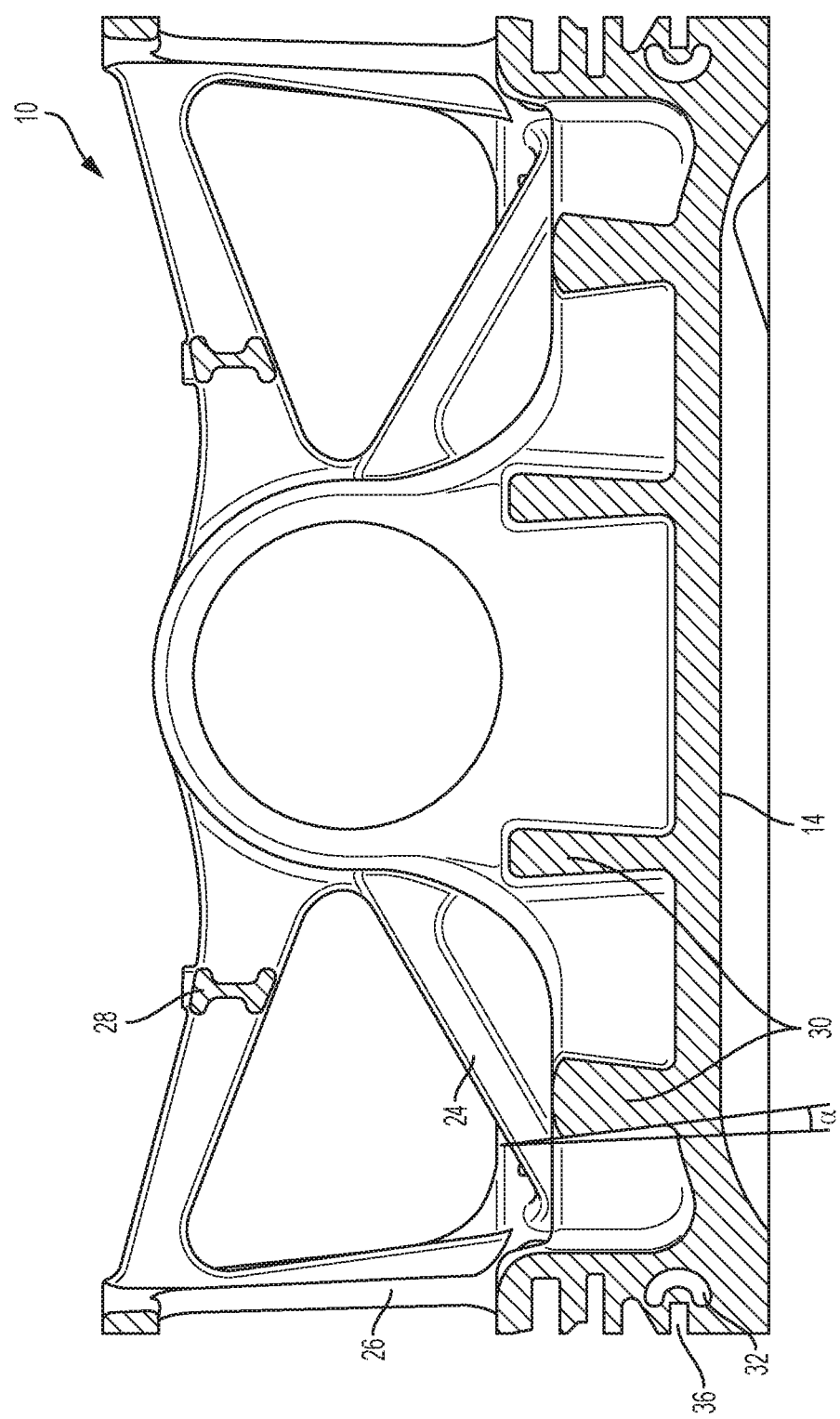
FIG. 2 is a cross-sectional view of the piston of FIG. 1.

With reference now to FIGS. 1 and 2, the additive manufacturing process provides many opportunities for the piston 10 to incorporate features not previously available to piston manufacturers. Many of these features provide functional strength to the piston in an integrally formed or monobloc design, while also allowing for lightweighting of the design. In an exemplary embodiment of the present invention, a plurality of crown and skirt support features extend below the undercrown surface 16 of the piston 10. The crown and skirt support features can take on various shapes in order to maximize stiffness with minimal mass. For example, the crown and skirt support features may include a plurality of stiffening ribs 24, which extend from the undercrown surface 16 and ring belt 18 towards the pin bosses 22. The stiffening ribs 24 may be arranged to protrude below the undercrown surface 16, such that the skirt 20 is arranged in a truss-like formation (e.g., as support braces 26) for managing the loading on the piston 10 without extraneous mass. The stiffening ribs 24 may be straight ribs (i.e., equal width over full length) or the ribs 24 may be indented along their length, such as with an I-beam or scallop shape for providing a reduced mass. In this way, the stiffening ribs 24 may essentially eliminate material from unstressed locations. In one example, various stiffening ribs 24 can be formed as I-beams 28 crossing support braces 26 for stiffening the structure of the skirt 20.

The crown and skirt support features may also include stiffeners 30 extending between the stiffening ribs 24 for providing added support thereto. The stiffeners 30 may be formed with negative draft angles, a, as best shown in FIG. 2. Negative draft angles provide increased support to extending features, while doing so with a lower mass.

With continued reference to FIGS. 1 and 2, the piston 10 may also include various cooling features that provide improved wear and material properties due to the lower piston temperatures. In one example, the piston 10 includes an enclosed or partially enclosed oil galley 32 within the area of the ring belt 18. The oil galley 32 may be opened to the undercrown surface 16 at opening 34 such that crankcase fluids (e.g., oil) may be received and carried through the ring belt 18 near the crown surface 14. The oil galley 32 may be contoured to extend around upper and lower surfaces of at least the top ring land 36 (e.g., c-shaped), as best shown in FIG. 2. In this way, the oil galley 32 may assist in cooling the ring lands. The oil galley 32 may extend fully around the ring belt 18 in an annular arrangement or may be segmented and spaced incrementally around the ring belt 18. By providing a segmented arrangement, the oil galley 32 may include multiple openings 34 allowing for greater fluid intrusion for cooling. It is also contemplated that at least one opening 34 can be arranged on the undercrown surface 16 for receiving cooling oil into the oil galley 32 from one or more oil jets (not shown). The at least one opening 34 can also be used to dispense the cooling oil from the oil galley 32 back to the crank case of the engine during operation. This continuous cycling of oil into oil galley 32 has the effect of extracting heat from the crown surface 14 to cool the crown surface 14 and allow it to operate in increased combustion pressures and temperatures.

Non-uniform hollows 38 may also be incorporated into the undercrown surface 16 to remove additional mass and assist in piston cooling. In one example shown in FIG. 1, non-uniform hollows 38 may be arranged beneath the pin bosses 22 to allow for added cooling features and to manage the extent of laminar versus turbulent flow. The non-uniform hollows 38 also allow greater fluid intrusion for cooling at the pin bosses 22.

Figure 4:
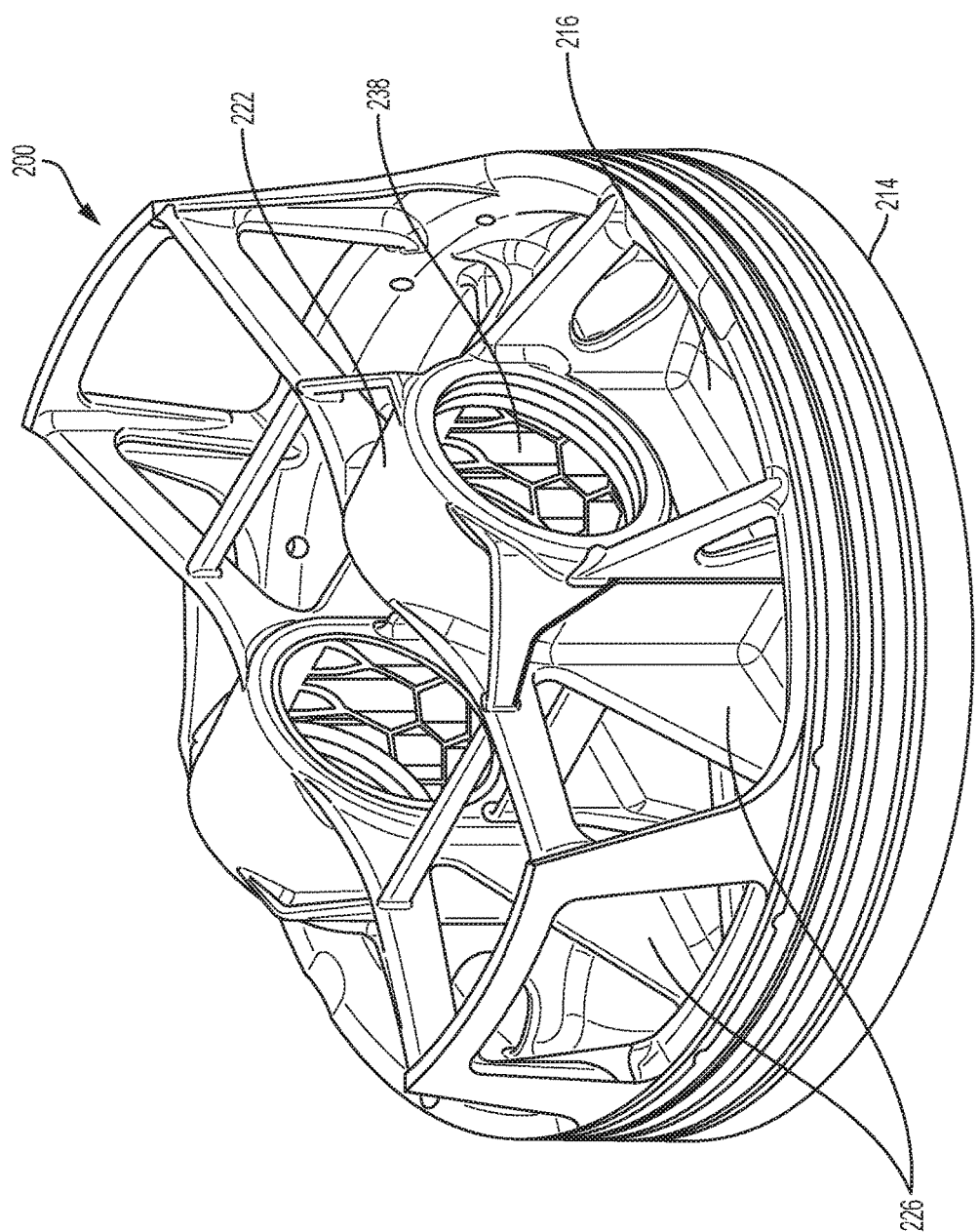
FIG. 4 is a perspective view of a piston according to another embodiment of the present disclosure.

In another example shown in FIG. 4, piston 200 may include non-uniform hollows 238 that take the form of a honeycomb or other lattice structure arranged below pin bosses 222. The non-uniform hollows 238 may provide added stiffening to the pin bosses 222. The non-uniform hollows 238 may be opened to the pin bosses 222 for easy material removal during processing. Alternatively, these honeycomb or lattice structures may be fully enclosed within the material of the piston 200. In this way, the non-uniform hollows 238 may be used to fill any volume where mass is undesirable. For example, a portion of the volume between the crown surface 214 and the undercrown surface 216 could be created with a fully enclosed honeycomb or lattice structure (e.g., portion extending between the support braces 226). In this way, a piston crown transverse to a wrist pin can be provided with added stiffness. Similar to the I-beam structure, outer elements can carry most of the load in tension and compression with the honeycomb or lattice structure present through the neutral axis.

Figure 3:
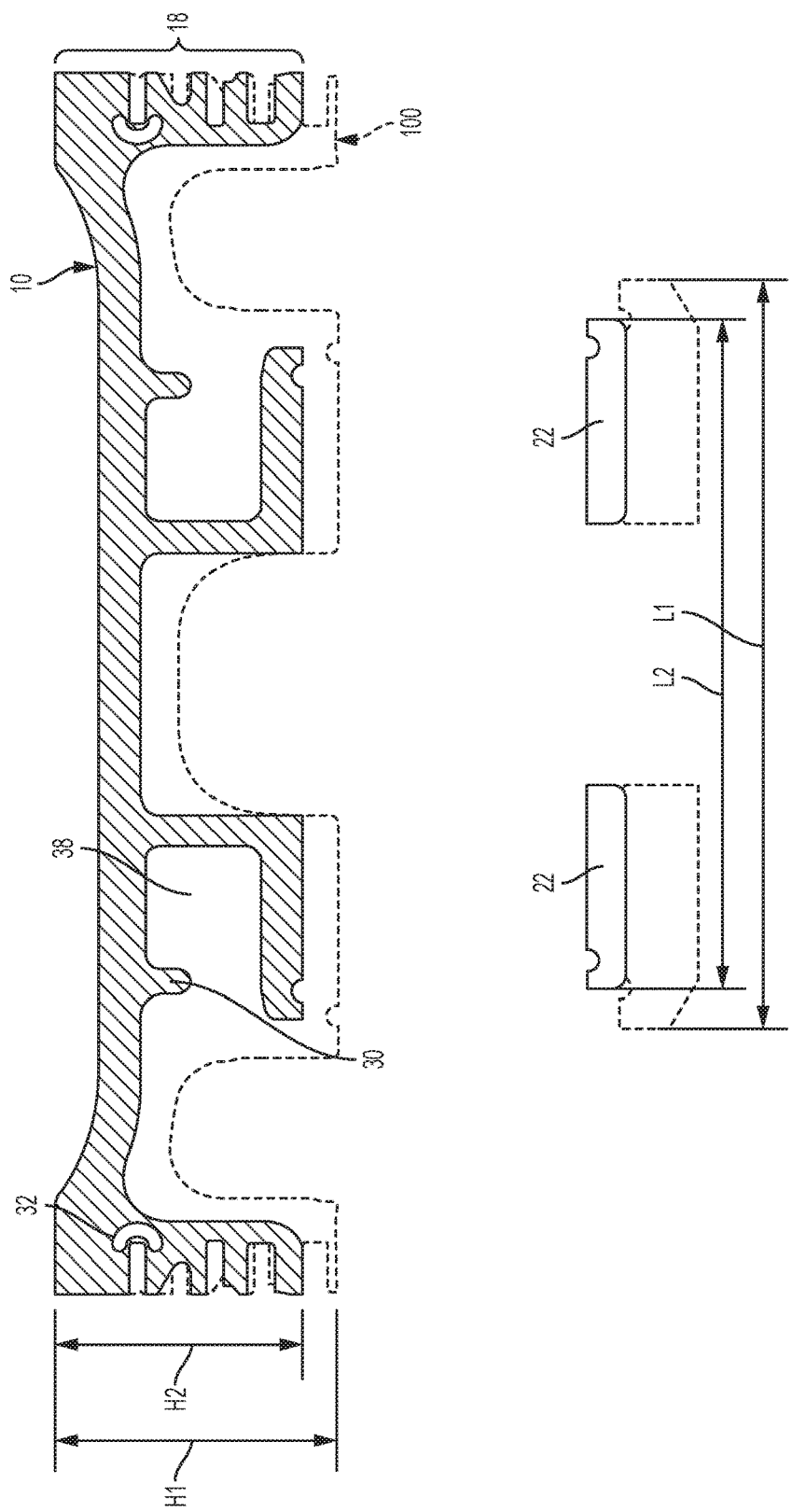
FIG. 3 is a partial cross-sectional view of the piston of FIG. 1 in comparison with a partial cross-sectional view of a previous design of the piston.

With reference now to FIG. 3, a standard design piston 100 (dashed image) is overlaid with the piston 10. Between the added stiffening features (e.g., stiffeners 30) and the added cooling features (e.g., oil galley 32, non-uniform hollows 38), the piston 10 can be designed to have a lower ring belt 18 height, a shorter wrist pin length (e.g., distance between pin bosses 22 is reduced), and less surface area for piston 10 friction in the cylinder bore. In other words, piston 100 includes a ring belt height H1 and piston 10 includes a ring belt height H2, with the ring belt height H2 less than the ring belt height H1. Similarly, the piston 100 includes a pin bore length L1 and piston 10 includes a pin bore length L2, with the pin bore length L2 less than the pin bore length L1.

The piston 10 of the exemplary embodiments is configured for use with a range of different types of internal combustion engines including, for example, spark or compression ignition two or four stroke internal combustion engines. Furthermore, the piston of the exemplary embodiments can be manufactured with a steel material during the additive manufacturing process or can be designed with many of the features presented above with an alternate material in place of steel. As such, it should be clear that this description is merely exemplary in nature and, thus, variations that do not depart from the gist of the disclosure are intended to be within the scope of the disclosure. Such variations are not to be regarded as a departure from the spirit and scope of the disclosure.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An integrally formed piston, comprising:
a crown portion having an upper crown surface and an undercrown surface;
a ring belt extending from the undercrown surface and around the periphery of the crown portion; and
a plurality of crown and skirt support features extending from the undercrown surface and the ring belt so as to form a skirt, wherein at least one of the plurality of crown and skirt support features has an I-beam cross-section.

2. The piston of claim 1, wherein at least one of the plurality of crown and skirt support features is a rib for stiffening the skirt of the piston.

3. The piston of claim 1, wherein the skirt further comprises:
a pair of pin bosses, wherein at least one of the plurality of crown and skirt support features is a honeycomb structure for supporting the pair of pin bosses.

4. The piston of claim 1, wherein the ring belt further comprises:
an oil galley for cooling at least one ring land in the ring belt.

5. The piston of claim 4, wherein the oil galley has an opening at the undercrown surface for receiving a cooling fluid therein.

6. The piston of claim 4, wherein the oil galley is contoured to extend around at least two opposing surfaces of the ring land within the ring belt.

7. The piston of claim 4, wherein the oil galley extends fully around the diameter of the ring belt.

8. The piston of claim 4, wherein the oil galley is segmented and spaced incrementally around the diameter of the ring belt.

9. An integrally formed piston, comprising:
a crown;
a ring belt extending from a surface of the crown at a periphery thereof, wherein the ring belt includes a plurality of ring lands and at least one oil galley extending therethrough, wherein the at least one oil galley is contoured to extend around at least two opposing surfaces of one of the plurality of ring lands; and
a skirt extending from the surface of the crown and the ring belt and having a plurality of stiffening features, wherein at least one of the plurality of stiffening features has an I-beam cross-section, and wherein the crown, the ring belt, and the skirt are integrally formed through an additive manufacturing process.

10. The piston of claim 9, further comprising:
at least one rib defining a pair of opposing rib surfaces extending perpendicularly from the surface of the crown so as to stiffen the skirt, and wherein the opposing rib surfaces are divergent at an end apart from the surface of the crown.

11. The piston of claim 9, wherein the crown further comprises:
a honeycomb structure between an upper crown surface and an undercrown surface of the crown.

12. The piston of claim 9, wherein the skirt further comprises:
a pair of pin bosses, wherein at least one of the plurality of stiffening features is a honeycomb structure for supporting the pair of pin bosses.

13. The piston of claim 9, wherein the oil galley has an opening at the surface of the crown for receiving a cooling fluid therein.

14. The piston of claim 9, wherein the oil galley extends fully around the diameter of the ring belt.

15. The piston of claim 9, wherein the oil galley is segmented and spaced incrementally around the diameter of the ring belt.

16. The piston of claim 9, wherein another of the plurality of stiffening features of the skirt has a first cross-sectional thickness at a crown surface end and a second cross-sectional thickness at an opposing free end, wherein the first cross-sectional thickness is less than the second cross-sectional thickness.

17. An integrally formed piston, comprising:
a crown portion having an upper crown surface and an undercrown surface;
a ring belt extending from the undercrown surface at a periphery thereof, wherein the ring belt includes at least one ring land and at least one oil galley contoured to extend around at least two opposing surfaces of the at least one ring land, and wherein the oil galley has an opening at the undercrown surface for receiving a cooling fluid therein for cooling the at least one ring land; and
a skirt extending from the undercrown surface and the ring belt and having a plurality of stiffening features, wherein at least one of the plurality of stiffening features has an I-beam cross-section.

* * * * *